Aug. 11, 1959  A. V. BATTISTA  2,898,641
LUBRICATING RACK CONSTRUCTION
Filed Dec. 6, 1954  7 Sheets-Sheet 1

FIG. 1

INVENTOR.
ANTHONY V. BATTISTA
BY
Frease & Bishop
ATTORNEYS

Aug. 11, 1959 A. V. BATTISTA 2,898,641
LUBRICATING RACK CONSTRUCTION
Filed Dec. 6, 1954 7 Sheets-Sheet 7

INVENTOR.
ANTHONY V. BATTISTA
BY Frease & Bishop
ATTORNEYS

2,898,641
LUBRICATING RACK CONSTRUCTION

Anthony V. Battista, Canton, Ohio

Application December 6, 1954, Serial No. 473,096

10 Claims. (Cl. 20—.8)

My invention relates to lubricating racks, and more specifically to a lubricating rack of considerable length provided with a conveyor device for moving a vehicle over the length of the rack while various operations of changing oil, greasing and lubricating are performed thereon.

Most prior lubricating racks found in garages and filling stations have been provided with sufficient room to accommodate only one vehicle at a time. These single car racks have included three general types, one of which consists of a so-called pit, whereby means is provided recessed below floor level and having an open top so that a vehicle may be driven over the pit and mechanics may move around in the pit beneath the vehicle to accomplish the lubricating and oil changing operations.

A second type has included a permanent structure constructed elevated above normal ground level with inclined ramps leading thereto so that a vehicle may be driven up the ramps onto the elevated platform and mechanics may move around therebeneath to perform the lubricating and oil changing operations.

A third type has included a lift means over which a vehicle may be driven and the lift means raised to elevate the vehicle above normal ground level. This third or lift type either engages the frame of the vehicle to lift it or the vehicle is driven on horizontal tracks mounted thereon.

One of the principal difficulties with these prior types of single car lubricating racks is that usually only one, or two mechanics at a maximum, may work on a vehicle at a time, so that considerable time is necessary to perform the lubricating and oil changing operations. This obviously, because of the necessity of having a vehicle in modern living, has caused certain inconveniences to the vehicle owners and in many cases has caused vehicle owners to forego necessary lubrication and oil changing because of the time required.

A further difficulty with some of these prior constructions of lubricating racks is that in all but the lift type which engages the frame rather than the wheels of the vehicle, the front wheels of the vehicle are retained in their normal position with the weight of the vehicle retained thereon. In most modern vehicles, it is impossible to accomplish proper lubricating and servicing of the front wheel assemblies unless the weight of the vehicle is removed therefrom so that the springs, steering arms and shock absorbers are in their maximum extended positions.

It is therefore a general object of the present invention to provide a lubricating rack construction which eliminates and overcomes the difficulties and disadvantages of the prior constructions enumerated above.

It is a primary object of the present invention to provide a lubricating rack construction upon which a number of vehicles may be positioned and be in various stages of greasing and oil changing at a single time.

It is a further object of the present invention to provide a lubricating rack construction in which the rack on which the vehicles are positioned is of considerable length, and the rack is provided with a conveyor for conveying the vehicle bodily along the length of the rack, while various operations of lubricating and oil changing are performed thereon.

It is still a further object of the present invention to provide a lubricating rack construction of considerable length having stations spaced along the length thereof, so that certain phases of lubricating and oil changing may be performed at each station, and if desirable, a mechanic may work at each station to perform only the particular operations of that particular phase.

It is another object of the present invention to provide a lubricating rack construction with which the operations of lubricating and oil changing may be accomplished in a fraction of the time heretofore possible.

It is still another object of the present invention to provide a lubricating rack construction with which the front wheels of a vehicle may be removed and the front wheel bearings greased while the vehicle is bodily conveyed along the length of the lubricating rack.

It is still a further object of the present invention to provide a lubricating rack construction with which the front end of the vehicle may be raised to extend the front springing, steering and shock absorbing devices, so that these devices may be properly greased while the vehicle is conveyed along the length of the lubricating rack.

Finally, it is an object of the present invention to provide a lubricating rack construction which accomplishes all of the above objects in a simple and efficient manner and which construction requires a minimum of maintenance to remain properly operable.

These and other objects are accomplished by the parts, constructions, arrangements, combinations and subcombinations comprising the present invention, the nature of which is set forth in the following general statement, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

The improved lubricating rack construction constituting the present invention may be stated generally as including an oil changing and lubricating rack for supporting a vehicle so that operators may stand thereberneath, said rack having a length at least as great as the combined length of two vehicles, and means conveying a vehicle along the length of the rack; whereby a vehicle may be placed on one end of the rack and the vehicle will be conveyed to the opposite end of the rack, during which conveying the various operations of oil changing and lubricating may be performed by operators standing beneath the vehicle.

More specifically, the improved lubricating rack construction constituting the present invention may be stated as including a floor having an oil changing and lubricating pit formed recessed therein, said pit preferably having a length at least as great as the combined length of two vehicles and having sides and a bottom and an open top, conveyor means positioned at the top of the pit adjacent one side thereof for supporting at least one wheel of a vehicle, said conveyor means preferably including a first and second section of continuous conveyor belt, the first section of conveyor belt extending from the entrance end of the pit to a point intermediate the ends of the pit, the second section of conveyor belt extending from a point adjacent said intermediate point to the exit end of the pit, means driving the second section of conveyor belt, clutch means connected to the first and second conveyor belts and selectively engageable to transmit drive from the second conveyor belt to the first, support means positioned at the top of the pit between the first and second conveyor belts spanning the distance therebetween at said intermediate point of the pit, hoist means positioned spaced vertically above the top of the pit and extending a portion of the length of the pit and selectively movable along a portion of the length of the pit, constructed so that the front end of a vehicle may be engaged and hoisted to any desired height and may remain so raised while the vehicle is moved over a portion of the length of the pit by the conveyor means, jack means positioned adjacent the top of the pit and selectively movable along a portion of the length of the pit and constructed so that the jack means may be positioned under the front wheel connections of a vehicle and the front wheels of the vehicle may be removed and packed with grease while the vehicle is moved over a portion of the length of the pit by the conveyor means, grease supply means extending over a portion of the length of the pit, and grease guns operably connected to the grease supply means at spaced points along the length of the grease supply means.

By way of example, an embodiment of the improved lubricating rack construction of the present invention is illustrated in the accompanying drawings forming a part hereof, wherein like numerals indicate similar parts throughout the several views, and in which.

The portion of the grease rack which supports the vehicle may be of any usual construction, such as, spaced tracks supported elevated above floor level a sufficient distance so that operators performing the lubricating and oil changing oerations may stand therebeneath and the wheels of the vehicle may be supported on the tracks. It is preferred, however, that the grease rack be of the "pit" construction, that is, having a platform supported recessed below floor level a sufficient distance so that when vehicles are moved over the pit, the operators may stand beneath such vehicles.

It should be understood, however, that the principles of the pressure invention may be applied to any of the various types of grease racks and that the scope of the present invention fully contemplates such forms. Thus, when the word "rack" is used in the present specification and claims, it is intended that such word be generic to all forms, whether of the elevated, lift or pit type.

As illustrated in the accompanying drawings and particularly in Figs. 1 through 6, the pit, generally indicated by 11, is preferably formed with a cement bottom wall 12, cement side walls 13 and 14, cement end walls 15 and 16 and an open top 17. The bottom wall 12 is spaced below the cement floor 18 a sufficient distance so that operators may stand on the bottom wall 12 of the pit 11 thereby positioning them fully below the level of floor 18.

The pit 11 is formed of considerable length, preferably a sufficient length to accommodate four or five vehicles at a time. A conveying means, generally indicated at 19, is positioned in the pit 11 adjacent one of the sides at floor level and extending substantially the entire length thereof.

The conveying means 19 preferably includes structural steel supporting members 20 of any usual and necessary type, and as illustrated in the drawings, the framework or members 20 are positioned adjacent and slightly spaced from the side wall 13 of the pit 11 and are fixedly secured to the floor 12 as indicated at 21, and the side wall 13 as indicated at 22. The conveying of the vehicles may be accomplished by use of a conveyor means comprised of one or several conveyor belts, and it should be understood that any usual type may be used and that a single continuous conveyor belt will accomplish the desired results.

Figure 10:
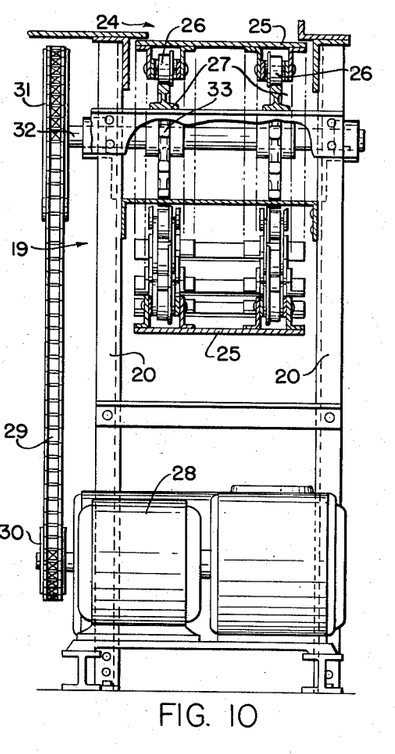
Fig. 10, an enlarged, fragmentary sectional view looking in the direction of the arrows 10—10 in Fig. 2.

It is preferred, however, to use metal belts having spaced, but interconnected, transverse metal bars of the type illustrated in the drawings in Fig. 10. It is also preferred that two lengths of conveyor belt be used, one extending from the entering end of the pit to an intermediate point slightly more than the distance of the length of a single vehicle from the end wall of the pit, and a second length of conveyor belt extending from the end of the first belt at the intermediate point to the exit end of the pit, for a purpose to be hereinafter described.

Figure 1:
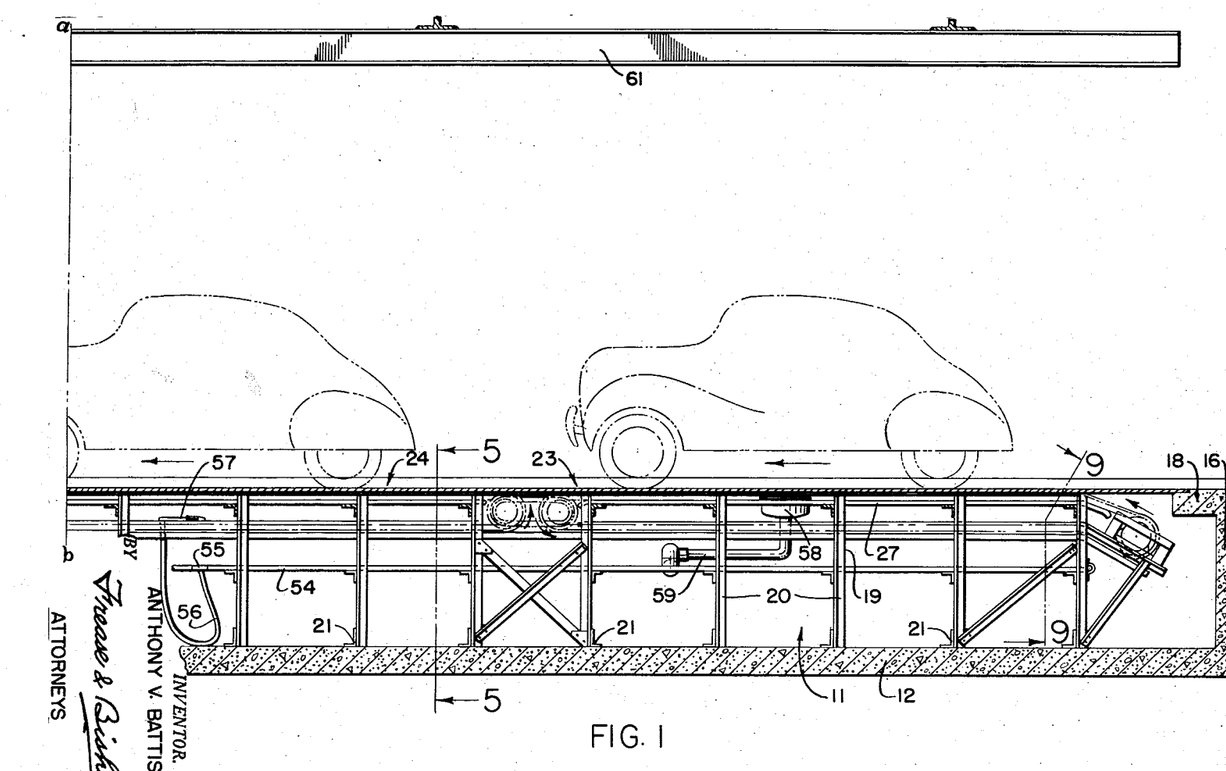
Fig. 1 is a side view, partly in section, partly in elevation and partly diagrammatic, illustrating the entering half of the lubricating rack construction.
Figure 3:
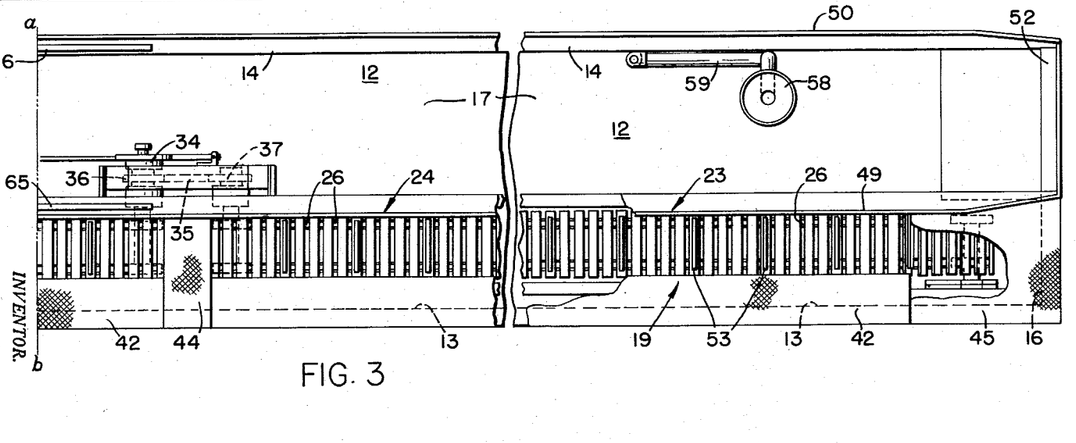
Fig. 3, a fragmentary top view, partly in section, partly in elevation and partly diagrammatic, of the entering half of the lubricating rack construction.

As illustrated in the drawings, a short length or section of conveyor belt, generally indicated at 23 in Figs. 1 and 3, is supported on the framework 20 with the top layer of the belt 23 spaced slightly below the top level of the floor 18, and extending from a point spaced inwardly from end wall 16 to an intermediate point a distance from end wall 16 slightly greater than the length of a single vehicle. The second or long length or section of conveyor belt, generally indicated at 24, is similarly supported by the framework 20 and extends from the intermediate point, or from a point spaced slightly beyond the end of the belt 23, to a point spaced slightly inwardly from the end wall 15, as shown.

Belts 23 and 24 include the interconnected and spaced transverse bars 25 which are supported on the usual rollers 26, which rollers are in turn supported on the usual rails 27. Rails 27 are supported on the framework 20 and support the top layers of the conveyor belts with the lower layer of the belts being permitted to swing freely below the upper layers between the usual sets of rotatably mounted end supporting sprockets. The usual types of guards and covers are provided.

Each of the continuous lengths of conveyor belts 23 and 24 may be separately driven, but it is preferred to drive the longer section of conveyor belt 24 and transmit the drive of this belt to the shorter section of conveyor belt 23 by means of a chain and clutch drive, so that the clutch may be selectively engaged and disengaged to selectively drive or stop the short section of conveyor belt 23, while the belt 24 may be continuously driven.

Figure 2:
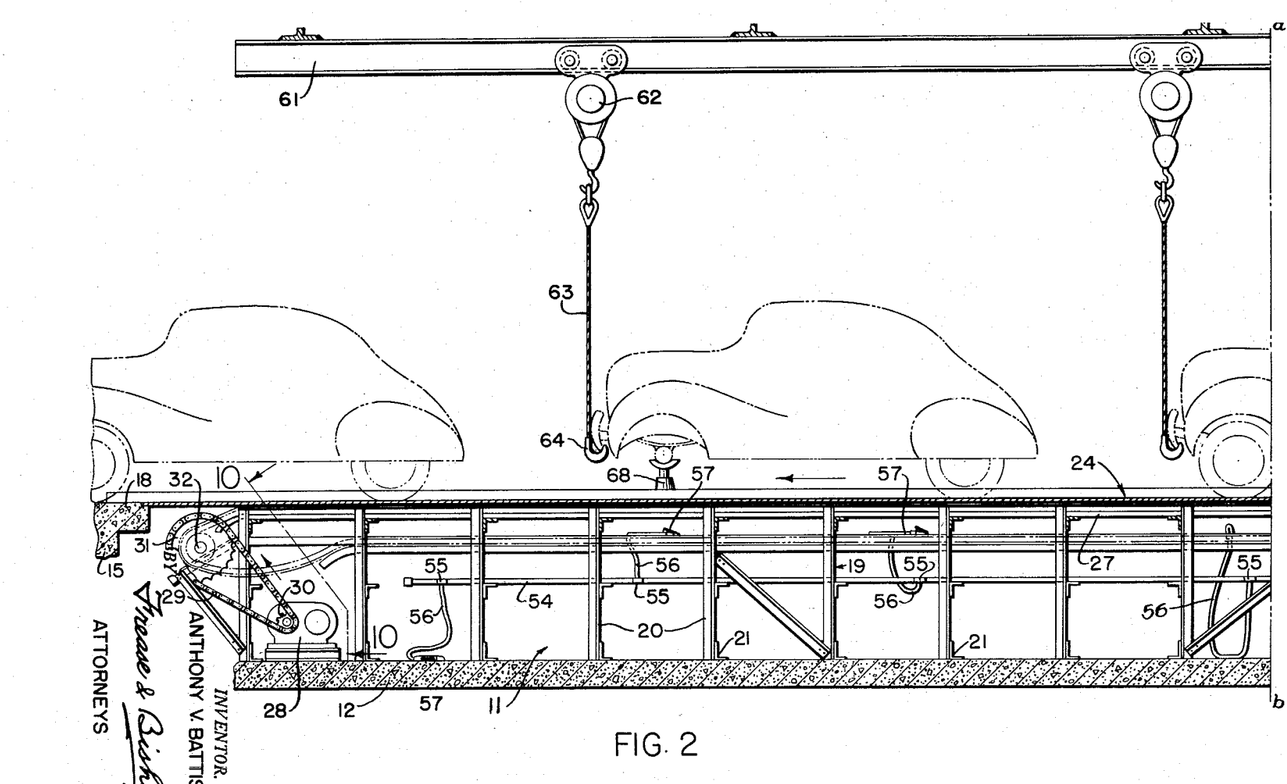
Fig. 2, a side view, partly in section, partly in elevation, and partly diagrammatic, illustrating the leaving or exit half of the lubricating rack construction.

As shown in the drawings, and particularly Figs. 2 and 10, the larger section of conveyor belt 24 may be driven by an electric motor gear reduction unit 28 through a chain drive 29. Chain 29 is connected to the sprocket 30 mounted on the unit 28, and to the sprocket 31 connected to the rotatable shaft 32, on which shaft the usual drive sprockets or wheels 33 supporting and driving the longer length of conveyor belt 24, are mounted. This drive system may be of any usual type, and as shown, is preferably mounted at and drives the end of the longer section of conveyor belt 24 which is adjacent the end wall 15.

Figure 7:
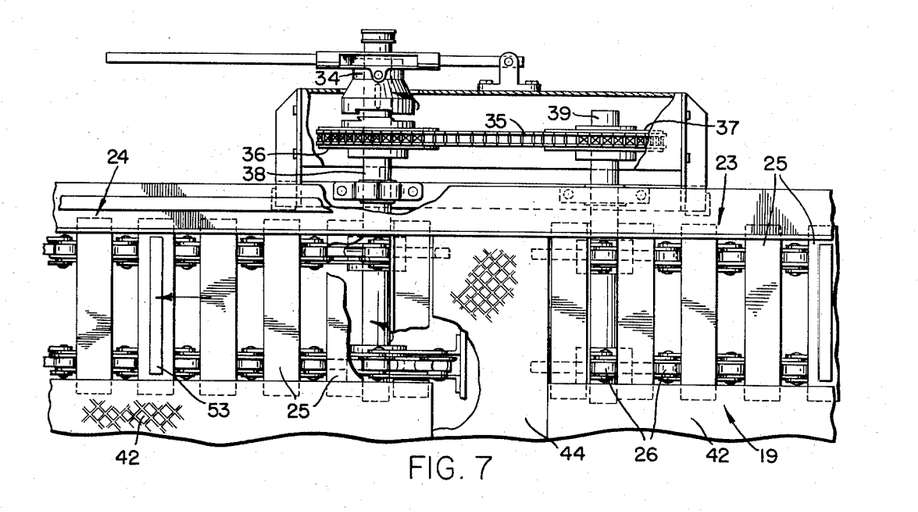
Fig. 7, a fragmentary top view, partly in section and partly in elevation, illustrating the clutch means between the two sections of conveyor belt in the disengaged position.
Figure 8:
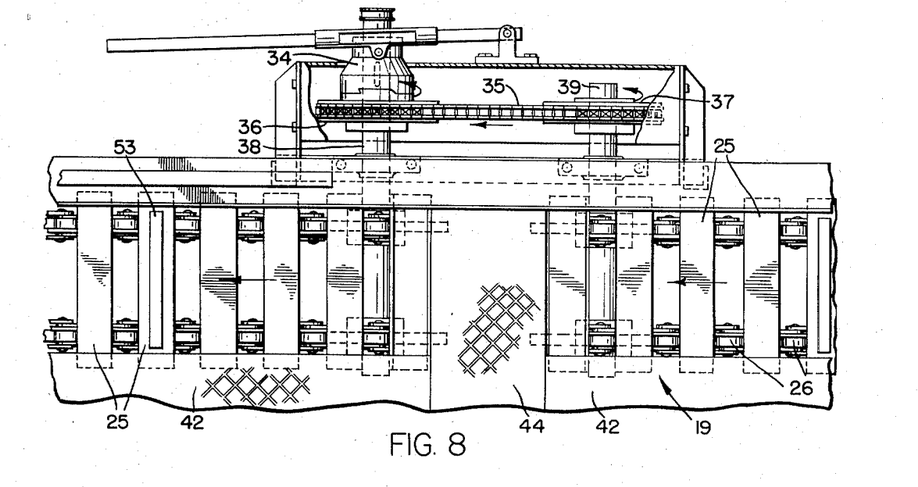
Fig. 8, a similar view to Fig. 6 with the clutching means engaged.

As before stated, the shorter section of conveyor belt 23 is preferably not driven, but is merely freely rotatably mounted, and receives its drive from the longer section of conveyor belt 24 through the clutch 34, chain 35 and sprockets 36 and 37, as best seen in Figs. 3, 7 and 8. Clutch 34 and sprocket 36 are mounted on the rotatable shaft 38, which shaft has mounted thereon the usual rotatable supporting sprockets or wheels, which sprockets support the end of the longer section of conveyor belt 24 which is adjacent the shorter section of conveyor belt 23.

Clutch 34, sprocket 36 and shaft 38 are constructed and arranged so that when the clutch 34 is in the disengaged position, as shown in Fig. 7, the shaft 38 will freely rotate in respect to sprocket 36, and sprocket 36 will not be driven. When clutch 34 is engaged, as shown in Fig. 8, drive or rotation will be transmitted from the shaft 38 to the sprocket 36, thereby driving sprocket 36.

Figure 9:
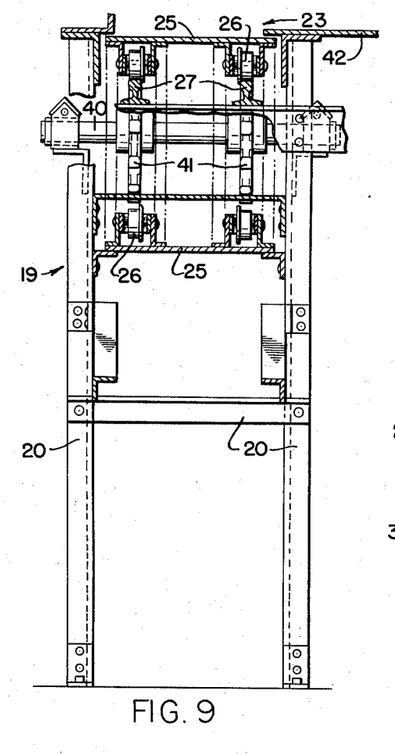
Fig. 9, an enlarged, fragmentary sectional view looking in the direction of the arrows 9—9 in Fig. 1.

Sprocket 36 is connected to sprocket 37, in driving relation, by means of the chain 35. Sprocket 37 is mounted on the shaft 39, which shaft 39 supports the rotatable wheels or sprockets, which sprockets in turn support and drive the end of the short section of conveyor belt 23 which is adjacent the end of the longer section of conveyor belt 24, as shown. The other end of the shorter section of conveyor belt 23, or that end adjacent the end wall 16, is supported in any usual manner, and as shown in Fig. 9 may be supported by a freely rotatable shaft 40 having the rotatable support sprockets or wheels 41 mounted thereon.

Figure 5:
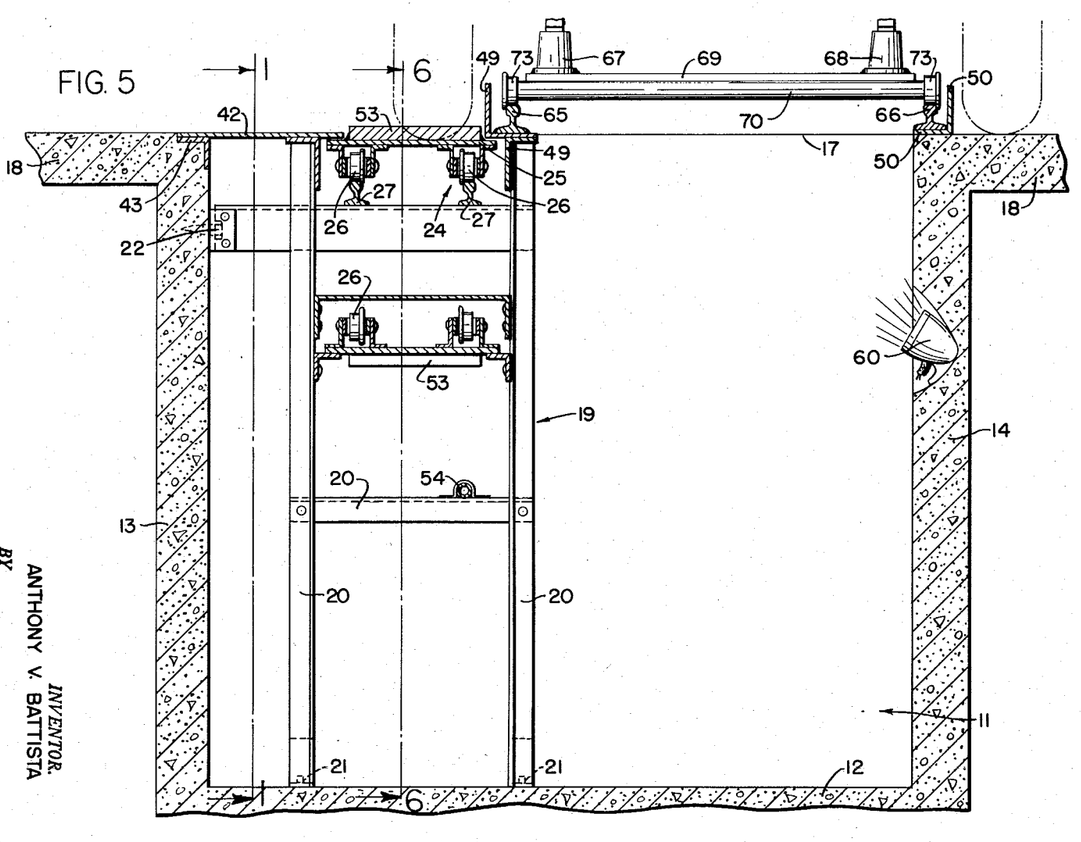
Fig. 5, an enlarged, fragmentary sectional view looking in the direction of the arrows 5—5 in Fig. 1.

As best seen in Fig. 5, a cover plate 42 is positioned spanning the distance from the side wall 13 to and overlying the nearest edge of conveyor belts 23 and 24. Plate 42 is preferably supported at the upper corner of the side wall 13 by the recessed angle member 43 so that the edge of the plate 42 is flush with the top surface of the floor 18, and the other side of the plate 42 is supported by the supporting framework 20 so that it overlies the conveyor belts 23 and 24, as shown.

Plate 42 runs the continuous length of the pit 11 with the exception of the portion at the intermediate point between the two sections of conveyor belts 23 and 24. This point is covered by a support plate 44 which extends from the side wall 13 completely across the width of the conveyor belts 23 and 24 and is supported on the framework 20 at the side thereof nearest the side wall 14. Plate 44 serves to cover the void between the two sections of conveyor belts 23 and 24 and also provides a support for the wheels of a vehicle, as the vehicle passes from conveyor belt 23 to conveyor belt 24.

A second support plate 45 is positioned extending from the end wall 16 to and overlying the end of the short section of conveyor belt 23 and also, similar to support plate 44, extends from the side wall 13 to the side of the framework 20 nearest the side wall 14, as shown. Plate 45 overlies the conveyor belt 23 a sufficient distance so that at the edge of plate 45, the conveyor belt 23 is at its maximum height in reference to the pit 11, so that the wheels of a vehicle may pass from the floor 18 over the plate 45 and onto the conveyor belt 23.

At the opposite end of the pit or at that end having the end wall 15, there is preferably formed the offset 46 in the pit 11 to accommodate the drive means for the conveyor belt system. Thus, at this end, two support plates 47 and 48 are required. Plate 47, similar to the support plate 45, extends at floor level from the end wall 15 to and overlying the longer section of conveyor belt 24, and from the side wall 13 to and is supported on the side of the supporting framework 20 nearest the side wall 14.

Plate 47, similar to plate 45, overlies the conveyor belt 24 a distance sufficient so that at the point where plate 47 ends, conveyor belt 24 is at its maximum height, so that the wheels of a vehicle may pass from conveyor belt 24 to the supporting plate 47.

The second support plate, indicated at 48, extends from plate 47 and covers the offset 46, with the inner edge of the plate 48 being in alignment with the inner edge of the cover plate 42. That is, plate 48 extends from the side wall 13 to and overlying the edge of conveyor belt 24, as does cover plate 42, and plate 48 is similarly supported at its inner edge by the supporting framework 20.

Again, as best seen in Fig. 5, angle member 49 is supported by and secured to the supporting framework 20 at the side nearest the side wall 14, and extends to and overlying the edge of the conveyor belts 23 and 24 at which point is positioned the upright flange of angle 49. Angle member 50 is mounted at the level of floor 18 at the top of the side wall 14 and extends from the inner surface of the side wall 14 outwardly, with the upright flange of angle 50 being positioned spaced from the inner surface of side wall 14.

The distance between the upright flanges of angles 49 and 50 is slightly less than the distance between the wheels of a vehicle, so that when a vehicle is positioned over the pit 11, its wheels at one side are on the conveyor belts 23 and 24 and its wheels on the other side are on the floor 18 beyond the side wall 14. Thus, the upright flanges of angles 49 and 50 are at all times between the wheels at either side of the vehicle, and thereby form a guard preventing the wheels of the vehicle from moving into the pit 11.

As seen in Figs. 1, 2, 3 and 4, the floor 18 overhangs a distance from the end walls 15 and 16 and the angle members 49 and 50 extend the length of these overhangs to the end walls 15 and 16. The angle members 49 and 50 are there joined by the cross angle members 51 and 52. Thus, the upright flanges of cross angle members 51 and 52 serve as guards to prevent the wheels of a vehicle from moving into the ends of the pit 11.

Figure 4:
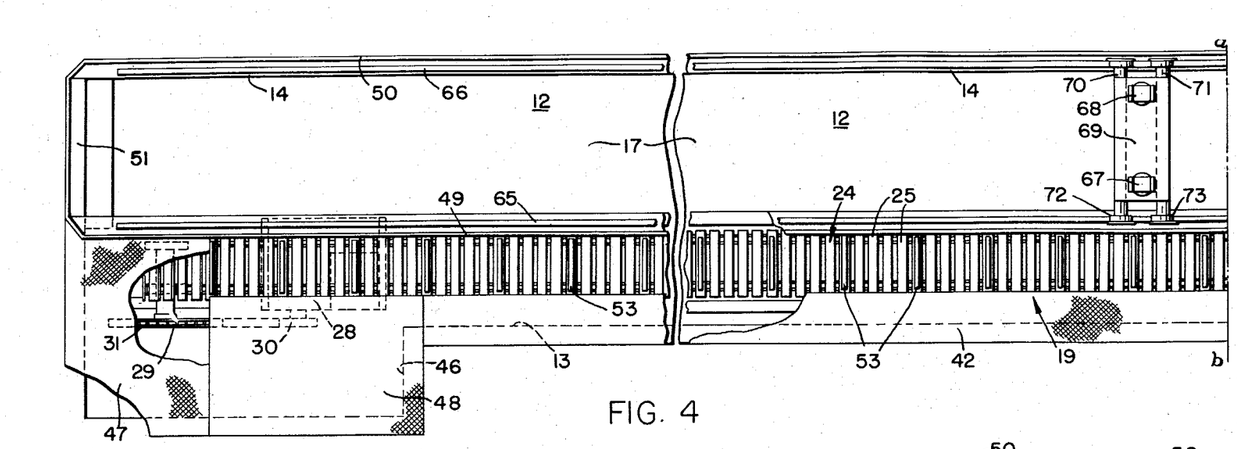
Fig. 4, a view similar to Fig. 3, of the leaving or exit half of the lubricating rack.
Figure 11:
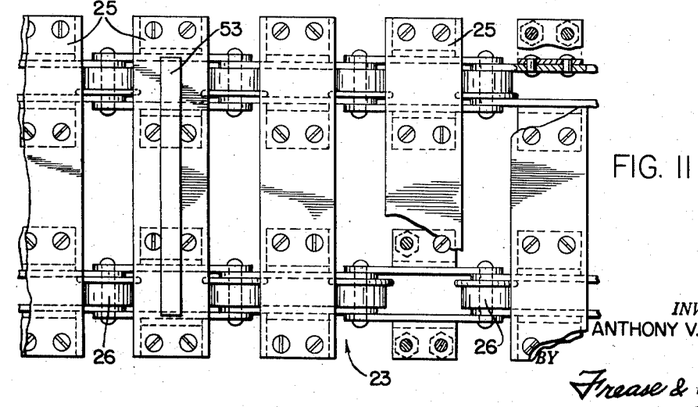
Fig. 11, an enlarged, fragmentary view, partly in section and partly in elevation, illustrating a portion of the conveyor belting used in constructing the two sections of conveyor belt of the lubricating rack construction.

As best seen in Figs. 3, 4 and 11, engagement bars 53 are affixed to certain of the spaced transverse bars 25 of the conveyor belts 23 and 24 at spaced points along the length of the belts, extending from the top surface of these conveyor belts a distance upwardly. Engagement bars 53 serve as an engagement means to engage the wheels of a vehicle which are supported on the conveyor belts, thereby serving to resist rotation of the wheels in reference to the belts while the vehicle is being conveyed along the length of the pit 11.

Figure 6:
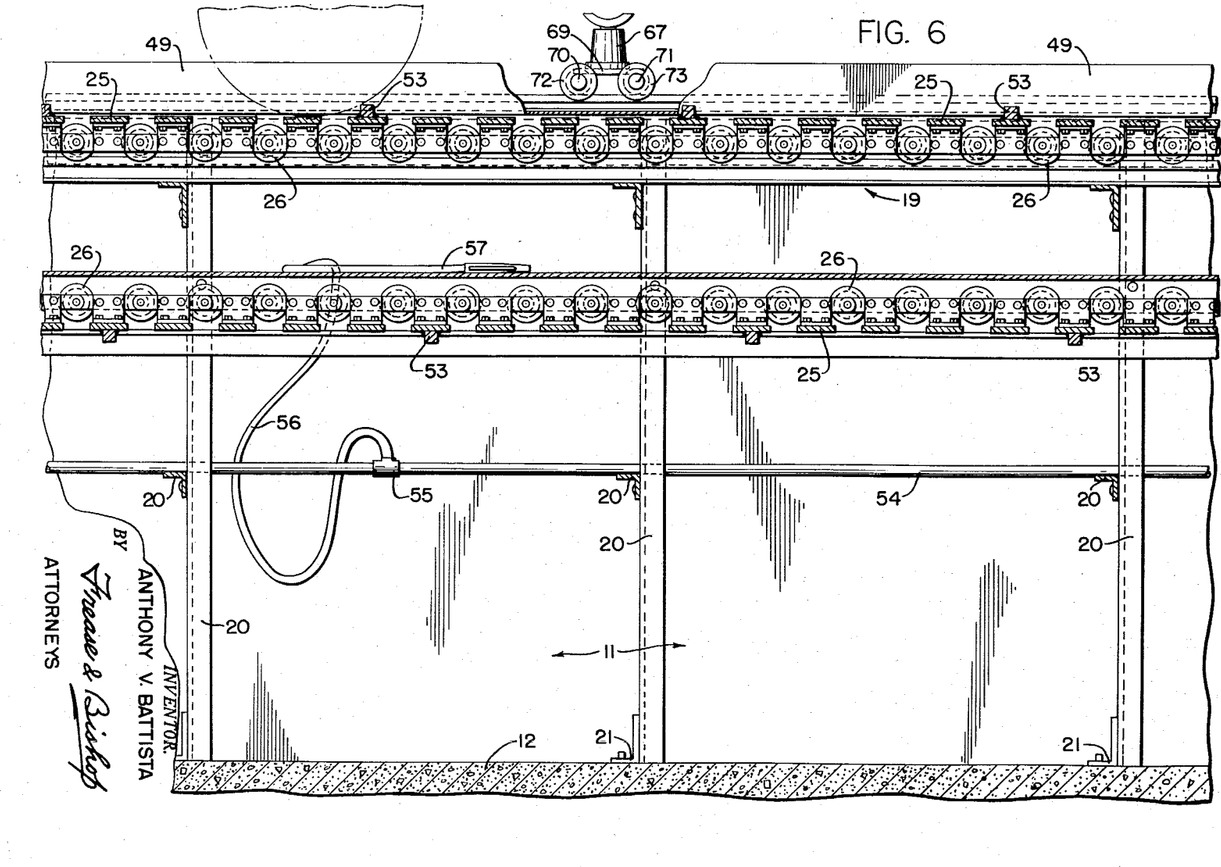
Fig. 6, an enlarged, fragmentary sectional view looking in the direction of the arrows 6—6 in Fig. 5.

Grease line 54 is supported by the supporting framework 20 preferably intermediate the bottom wall 12 and the open top 17 of the pit 11, as shown in Figs. 1, 2 and 6. Line 54 preferably extends substantially the entire length of the conveyor belts 23 and 24, thereby extending a major portion of the length of the pit 11, and may be constructed of any usual piping sufficient to withstand grease under pressure.

Positioned at spaced intervals along the length of line 54 are the couplings 55 which serve to connect the grease gun lines 56 and the grease guns 57 in communication with the grease line 54. The end of the grease line 54 nearest the end wall 16 of the pit 11 is connected to a supply of grease under pressure from a main supply tank, not shown, which is preferably adjacent the end wall 16. Thus, grease under pressure may be supplied through the grease line 54, the grease gun lines 56 to the grease guns 57, and these grease guns may be positioned at convenient intervals along the length of the pit 11.

An oil drain receptacle 58, shown in Figs. 1 and 3, is pivotally mounted to the side wall 14 by means of pipes 59 in any usual manner. Receptacle 58 is preferably positioned spaced slightly below the top level of floor 18 with the pivotal connection of pipes 59 permitting the receptacle 58 to be positioned at any point over the width of the pit 11 between the side wall 14 and the supporting framework 20. Pipes 59 are connected through the side wall 14 to an oil tank, not shown, positioned beneath the ground. Thus, oil drain receptacle 58 may be positioned beneath the oil pan drain outlet (not shown) of a vehicle, and the oil may be drained from the vehicle engine through the pipes 59 to the tank.

Lights 60 are preferably mounted recessed in the side wall 14, as shown in Fig. 5, at spaced intervals along the length of the pit 11. These lights are preferably tilted so that they will direct the light upwardly against the bottoms of vehicles positioned over the pit 11, thereby providing proper illumination to the bottoms of the vehicles so that operators working in the pit 11 may properly perform the various lubricating and oil changing operations.

A conveyor supporting track 61 is mounted spaced upwardly from the open top 17 of the pit 11, as shown in Figs. 1 and 2. Track 61 extends substantially the entire length of pit 11 and is positioned preferably in vertical alignment with the mid-point of a vehicle positioned over pit 11.

A usual construction of conveyor hoist 62 is engaged with track 61 so that hoist 62 may be moved along the length of the pit 11. A cable extension 63, provided with one or more hooks 64, is engaged with the hoist 62 so that hook 64 may be engaged with the front bumper of a vehicle positioned over the pit 11, as shown in Fig. 2. Thus the front portion of the vehicle may be partially raised to remove a portion of the weight of the vehicle from the front supporting springs and steering mechanism of the vehicle, and at the same time, the vehicle may be conveyed along the length of the pit 11.

As shown in Fig. 5, tracks 65 and 66 are mounted on the angle members 49 and 50 with these tracks extending preferably the length of conveyor belt 24. Jacks 67 and 68 are mounted in spaced apart relationship on the supporting plate 69, which plate 69 in turn is mounted on the spaced supporting cross members 70 and 71. Cross members 70 and 71 are provided with sets of supporting wheels 72 and 73, which wheels are rotatably mounted on the ends of cross members 70 and 71 and are engaged with the tracks 65 and 66. Thus, if it is desired to remove the front wheels of a vehicle so that the bearings thereof may be packed with grease, the jacks 67 and 68 may be raised to engage the front portion of the vehicle and at the same time, the vehicle may be progressively conveyed along the length of the pit 11.

In operation of the lubricating rack construction of the present invention, the drive motor 28 is started, thereby driving the conveyor belt 24. The clutch 34 may then be engaged, thereby transmitting the motion of the conveyor belt 24 to the conveyor belt 23 and driving belt 23. A vehicle may then be driven so that the front end thereof is over the pit 11, and so that one of the front wheels is engaged and supported by the conveyor belt 23 and the other front wheel is adjacent the upright flange of the angle member 50 and resting on the floor 18. At this point, the engine of the vehicle is shut off and the gears and the brakes of the vehicle are disengaged so that all of the wheels of the vehicle may freely rotate.

The front wheel of the vehicle supported by the conveyor belt 23 will turn as the conveyor belt 23 moves, until one of the engagement bars 53 engages behind the wheel. Thereafter, the wheel will no longer rotate and the vehicle will be conveyed or moved forwardly by the conveyor belt 23, with one of the back wheels thereof ultimately also becoming engaged with and supported by the conveyor belt 23. The front and back wheels of the vehicle which are positioned adjacent the angle member 50 and supported by the floor 18 rotate freely as the vehicle is being conveyed by belt 23.

After the vehicle is positioned totally over the pit 11, and the oil pan drain outlet of the vehicle engine is positioned in the vicinity over the oil drain receptacle 58, the clutch 34 is disengaged so that the conveyor belt 23 is no longer driven from conveyor belt 24, thus stopping conveyor belt 23 and stopping the movement of the vehicle. At this point, the oil may be drained from the vehicle engine into the oil drain receptacle 58.

After the oil is drained from the vehicle engine, the same may be refilled with new oil by an operator located on floor 18. The clutch 34 is again engaged, causing the conveyor belt 23 to again move the vehicle along the pit 11. As the front wheel of the vehicle supported by the belt 23 reaches the forward end of belt 23, adjacent the belt 24, this wheel will be engaged by support plate 44, and the wheel will again begin turning until the wheel moves across plate 44 and is engaged and supported on the conveyor belt 24.

At any time after the oil changing operation, the front bumper of the vehicle may be engaged by the hook or hooks 64 of the cable extension 63 engaged with the conveyor hoist 62, and the weight at the front end of the vehicle may be partially removed from the front wheel supporting springs and steering mechanism of the vehicle thereby extending these parts. After the front end of the vehicle has been partially raised by the hoist 62, as the vehicle moves along the length of the pit 11, the hoist 62 will move along the supporting track 61, so that hoist 62 is always in proper position and properly supports the front end of the vehicle. Further, although the front end of the vehicle has been raised, the front wheels still touch the floor and conveyor belt.

As the front end of the vehicle moves over and is supported by the conveyor belt 24, the front wheel will continue to rotate caused by the movement of belt 24 and the vehicle will cease its forward movement until one of the engagement bars 53 on the belt 24 engages behind the front wheel causing the front wheel to stop its rotation and the vehicle to move forwardly along the pit 11. The vehicle will continue to move along the pit 11 and the rear wheel positioned over the conveyor belts will, as the front wheel passes over plate 44 and onto conveyor belt 24.

At any time, after or just prior to the front wheel of the first vehicle becoming positioned over the conveyor belt 24 and being conveyed forwardly along the pit 11 by belt 24, a second vehicle may be driven over the pit 11 until one of the front wheels thereof is positioned over the conveyor belt 23, as it was in the case of the first vehicle. The second vehicle may be moved forwardly by the conveyor belt 23 until it is properly positioned over the oil drain receptacle 58 and the clutch 34 may be disengaged to stop the forward movement of the second vehicle, while at the same time, the first vehicle will continue to move along the length of the pit 11, being conveyed by the continuously moving conveyor belt 24.

During the movement of the first vehicle over the remainder of the length of the pit by the conveyor belt 24, as the vehicle passes over the various stations or points at which the grease guns 57 are connected to the grease line 54, the various operations of lubricating the various parts of the vehicle may be performed. Also during this period, the front end of the car may be engaged by the jacks 67 and 68 so that the front wheels of the vehicle may be removed and the bearings thereof may be packed with grease. During the time, the front end of the vehicle is engaged by the jacks 67 and 68, these jacks will move along the length of the pit 11 with the sets of wheels 71 and 72 engaged by and rolling along the tracks 65 and 66.

As the vehicle approaches the end wall 15, the front wheels have been packed and replaced and the hook or hooks 64 on the cable extension 63 may be disengaged from the front bumper of the vehicle and the hoist 62 no longer used. Thereafter, the front wheels of the vehicle pass over the end wall 15, and the conveyor belt 24 engaged with the rear wheel of the vehicle, moves the rear wheel onto the supporting plate 47. At this point, or at any time prior thereto that the various operations of lubricating have been completed, the engine of the vehicle may be started and the vehicle driven the remainder of the length of the pit 11 so that it is no longer positioned over pit 11.

As each successive vehicle has had the oil drained therefrom, and the front wheel thereof becomes engaged with the conveyor belt 24, another vehicle may be driven on the conveyor belt 23. It is preferable that the total length of the pit be sufficient that four or five vehicles may be positioned thereover at any one moment, so that a number of operators may be positioned in the pit 11 with each operator performing a particular phase of the oil changing and lubricating operation, and at the same time the vehicles may still be continuously conveyed along the length of pit 11.

As illustrated in Fig. 2, a number of hoists 62 may be supported by the track 61 so that when a number of vehicles are positioned over the pit 11, each one may have the front end thereof partially raised by a hoist 62. Also, a number of jacks 67 and 68 may be provided so that a number of vehicles may have the front wheels thereof removed for packing, while each of them is still being conveyed along the length of the pit 11 by the conveyor belt 24.

Thus, there has been herein illustrated and described a lubricating rack construction on which a number of vehicles may be positioned and be in various stages of greasing and oil changing at a single time; in which the rack upon which the vehicles are positioned is of considerable length and the rack is provided with a conveyor for conveying the vehicle bodily along the length of the rack while various operations of lubricating and oil changing are performed thereon; having considerable length and having stations spaced along the length thereof so that certain phases of lubricating and oil changing may be performed at each station, and if desirable, an operator may work at each station to perform only the particular operations of that particular phase; with which the operations of lubricating and oil changing may be accomplished in a fraction of the time heretofore possible; with which the front wheels of a vehicle may be removed and the front wheel bearings packed with grease, while the vehicle is bodily conveyed along the length of the lubricating rack; with which the front end of the vehicle may be raised to extend the front springing, steering and shock absorbing devices so that these devices may be properly greased while the vehicle is conveyed along the length of the lubricating rack; and which accomplishes all of these things in a simple and efficient manner and which construction requires a minimum of maintenance to remain properly operable.

In the foregoing description, certain terms have been used for brevity, clearness and understanding, but no unnecessary limitations are to be implied therefrom, because such words are used for descriptive purposes herein, and are intended to be broadly construed.

Moreover, the embodiment of the improved construction illustrated and described herein is by way of example, and the scope of the present invention is not limited to the exact details of construction shown.

Having now described the invention, the construction, operation and use of a preferred embodiment thereof, and the advantageous new and useful results obtained thereby; the new and useful construction and reasonable mechanical equivalents thereof obvious to those skilled in the art are set forth in the appended claims.

I claim:

1. Lubricating rack construction including an oil changing and lubricating rack for supporting vehicles provided with space so that operators may be positioned beneath vehicles supported thereon, said rack having a length and ends, the length of the rack being equal to at least the combined length of a series of vehicles, conveyor belt means including a first and second section of continuous conveyor belt engaging and supporting at least two wheels of each of a series of vehicles simultaneously and thereby simultaneously moving the vehicles along the length of the rack, the first section of conveyor belt extending from one end of the rack to a point intermediate the ends of the rack and having a length equal to the length of at least one of said vehicles, the second section of conveyor belt extending from a point adjacent said intermediate point to the end of the rack opposite from said one end and having a length equal to at least the combined length of the remainder of said series of vehicles, support means positioned spanning the distance between the first and second sections of conveyor belt at said intermediate point of the rack, and means operatively connected to said first and second sections of conveyor belt for selectively driving said second section alone and both said sections simultaneously; whereby the vehicles may be placed at one end of the rack and will be moved to the opposite end of the rack during which movement the various operations of oil changing and lubricating may be performed by operators positioned beneath the vehicles, and the movement of each vehicle may be stopped on the first section of conveyor belt for oil changing.

2. Lubricating rack construction including an oil changing and lubricating rack for supporting vehicles provided with space so that operators may be positioned beneath the vehicles supported thereon, said rack having a length and ends, the length of the rack being equal to at least the combined length of a series of vehicles, conveyor belt means including a first and second section of continuous conveyor belt engaging and supporting at least two wheels of each of a series of vehicles simultaneously and thereby simultaneously moving the vehicles along the length of the rack, the first section of conveyor belt extending from one end of the rack to a point intermediate the ends of the rack and having a length equal to the length of at least one of said vehicles, the second section of conveyor belt extending from a point adjacent said intermediate point to the end of the rack opposite from said one end and having a length equal to at least the combined length of the remainder of said series of vehicles, support means positioned between the first and second sections of conveyor belt spanning the distance therebetween at said intermediate point of the rack, means for selectively driving said second section of conveyor belt, and clutch means selectively engageable, and operably connected to selectively transmit drive from said second section of conveyor belt to and driving said first section of conveyor belt; whereby the vehicles may be placed at one end of the rack and will be moved to the opposite end of the rack during which movement the various operations of oil changing and lubricating may be performed by operators positioned beneath the vehicles, and the movement of each vehicle may be stopped on the first section of conveyor belt for oil changing.

3. Lubricating rack construction including an oil changing and lubricating rack for supporting vehicles provided with space so that operators may be positioned beneath vehicles supported thereon, said rack having a length and ends, the length of the rack being equal to at least the combined length of a series of vehicles, conveyor belt means including a first and second section of continuous conveyor belt engaging and supporting at least two wheels of each of a series of vehicles simultaneously and thereby simultaneously moving the vehicles along the length of the rack, the first section of conveyor belt extending from said one end of the rack to a point intermediate the ends of the rack and having a length equal to the length of at least one of said vehicles, the second section of conveyor belt extending from a point adjacent said intermediate point to the end of the rack opposite from said one end and having a length equal to at least the combined lengths of the remainder of said series of vehicles, support means positioned between the first and second sections of conveyor belt spanning the distance therebetween at said intermediate point of the rack, a series of spaced engagement means extending from each of said first and second sections of conveyor belt simultaneously engageable with at least one of said two wheels of each of said vehicles, means for selectively driving said second section of conveyor belt, and clutch means selectively engageable and operably connected to selectively transmit drive from said second section of conveyor belt to and driving said first section of conveyor belt; whereby the vehicles may be placed at one end of the rack and will be moved to the opposite end of the rack during which movement the various operations of oil changing and lubricating may be performed by operators positioned beneath the vehicles, and the movement of each vehicle may be stopped on the first section of conveyor belt for oil changing.

4. Lubricating rack construction including a floor having an oil changing and lubricating pit formed recessed therein in which operators may be positioned beneath vehicles supported at substantially floor level over the pit, said pit being elongated and having an open top and ends, the length of the pit being equal to at least the combined length of a series of vehicles, conveyor belt means including a first and second section of continuous conveyor belt engaging and supporting at least two wheels of each of a series of vehicles simultaneously and thereby simultaneously moving the vehicles over said open top and along the length of the pit, the first section of conveyor belt extending from one end of the pit to a point intermediate the ends of the pit and having a length equal to the length of at least one of said vehicles, the second section of conveyor belt extending from a point adjacent said intermediate point to the end of the pit opposite from said one end and having a length equal to at least the combined length of the remainder of said series of vehicles, support means positioned spanning the distance between the first and second sections of conveyor belt at said intermediate point of the pit, and means operatively connected to said first and second sections of conveyor belt for selectively driving said second section alone and both said sections simultaneously, whereby the vehicles may be placed at one end of the pit and will be moved over said pit to the opposite end thereof during which movement the various operations of oil changing and lubricating may be performed by operators positioned beneath the vehicles, and the movement of each vehicle may be stopped on the first section of conveyor belt for oil changing.

5. Lubricating rack construction including a floor having an oil changing and lubricating pit formed recessed therein in which operators may be positioned beneath vehicles supported substantially at floor level over the pit, said pit being elongated and having an open top and ends, the length of the pit being equal to at least the combined length of a seriese of vehicles, conveyor belt means including a first and second section of continuous conveyor belt engaging and supporting at least two wheels of each of a series of vehicles simultaneously and thereby simultaneously moving the vehicles over said open top and along the length of the pit, the first section of conveyor belt extending from one end of the pit to a point intermediate the ends of the pit and having a length equal to the length of at least one of said vehicles, the second section of conveyor belt extending from a point adjacent said intermediate point to the end of the pit opposite from said one end and having a length equal to at least the combined length of the remainder of said series of vehicles, support means positioned between the first and second sections of conveyor belt spanning the distance therebetween at said intermediate point of the pit, means for selectively driving said second section of conveyor belt, and clutch means selectively engageable and operably connected to selectively transmit drive from said second section of conveyor belt to and driving said first section of conveyor belt; whereby the vehicles may be placed at one end of the pit and will be moved over said pit to the opposite end thereof during which movement the various operations of oil changing and lubricating may be performed by operators positioned beneath the vehicles, and the movement of each vehicle may be stopped on the first section of conveyor belt for oil changing.

6. Lubricating rack construction including an oil changing and lubricating rack for supporting vehicles provided with space so that operators may be positioned beneath vehicles supported thereon, said rack having a length and ends, the length of the rack being equal to at least the combined length of a series of vehicles, conveyor belt means including a first and second section of continuous conveyor belt engaging and supporting at least two wheels of each of a series of vehicles simultaneously and thereby simultaneously moving the vehicles along the length of the rack, the first section of conveyor belt extending from one end of the rack to a point intermediate the ends of the rack and having a length equal to the length of at least one of said vehicles, the second section of conveyor belt extending from a point adjacent said intermediate point to the end of the rack opposite from said one end and having a length equal to at least the combined length of the remainder of said series of vehicles, support means positioned between the first and second sections of conveyor belt spanning the distance therebetween at said intermediate point of the rack, means for selectively driving said second section of conveyor belt, clutch means selectively engageable and operably connected to selectively transmit drive from said second section of conveyor belt to and driving said first section of conveyor belt, a series of hoist means positioned spaced vertically above the rack and constructed to be movable along a portion of the length of the rack for engagement with and to raise front ends of each of said vehicles during at least a selected period of continued movement of said vehicles along the length of the rack, and a series of jack means removably mounted on the rack and constructed to be selectively movable along at least a portion of the length of the rack for selective engagement with selected vehicles during continued movement of said vehicles along the length of the rack; whereby the vehicles may be placed at one end of the rack and will be moved to the opposite end of the rack during which movement the various operations of oil changing and lubricating may be performed by operators positioned beneath the vehicles, the movement of each vehicle may be stopped on the first section of conveyor belt for oil changing, at least during a portion of said movement the front ends of the vehicles may be partially raised by the hoist means, and also wheels may be removed from selected vehicles supported by the jack means for tire changing.

7. Lubricating rack construction including an oil changing and lubricating rack for supporting vehicles provided with space so that operators may be positioned beneath vehicles supported thereon, said rack having a length and ends, the length of the rack being equal to at least the combined length of a series of vehicles, conveyor belt means including a first and second section of continuous conveyor belt engaging and supporting at least two wheels of each of a series of vehicles simultaneously and therefore simultaneously moving the vehicles along the length of the rack, the first section of conveyor belt extending from one end of the rack to a point intermediate the ends of the rack and having a length equal to the length of at least one of said vehicles, the second section of conveyor belt extending from a point adjacent said intermediate point to the end of the rack opposite from said one end and having a length equal to at least the combined length of the remainder of said series of vehicles, and means operatively connected to said first and second sections of conveyor belt for selectively driving said second section alone and both said sections simultaneously; whereby the vehicles may be placed at one end of the rack and will be moved to the opposite end of the rack during which movement the various operations of oil changing and lubricating may be performed by operators positioned beneath the vehicles, and the movement of each vehicle may be stopped on the first section of conveyor belt for oil changing.

8. Lubricating rack construction including an oil changing and lubricating rack for supporting vehicles provided with space so that operators may be positioned beneath vehicles supported thereon, said rack having a length and ends, the length of the rack being equal to at least the combined length of a series of vehicles, conveyor belt means including a first and second section of continuous conveyor belt engaging and supporting at least two wheels of each of a series of vehicles simultaneously and thereby simultaneously moving the vehicles along the length of the rack, the first section of conveyor belt extending from one end of the rack to a point intermediate the ends of the rack and having a length equal to the length of at least one of said vehicles, the second section of conveyor belt extending from a point adjacent said intermediate point to the end of the rack opposite from said one end and having a length equal to at least the combined length of the remainder of said series of vehicles, means for selectively driving said second section of conveyor belt, and clutch means selectively engageable and operably connected to selectively transmit drive from said second section of conveyor belt to and driving said first section of conveyor belt; whereby the vehicles may be placed at one end of the rack and will be moved to the opposite end of the rack during which movement the various operations of oil changing and lubricating may be performed by operators positioned beneath the vehicles, and the movement of each vehicle may be stopped on the first section of conveyor belt for oil changing.

9. Lubricating rack construction including an oil changing and lubricating rack for supporting vehicles provided with space so that operators may be positioned beneath vehicles supported thereon, said rack having a length and ends and a first and second portion, the total length of the rack being equal to at least the combined length of a series of vehicles, conveyor means including a first and second section for engaging each of a series of vehicles supported on the rack simultaneously and thereby simultaneously moving the vehicles along the length of the rack, the rack first portion extending from one end of the rack to a point intermediate the ends of the rack and having a length equal to the length of at least one of said vehicles, the rack second portion extending from a point adjacent said intermediate point to the end of the rack opposite from said one end and having a length equal to at least the combined length of the remainder of said series of vehicles, the conveyor means first section being mounted at the rack first portion for moving the vehicles along the length of said rack first portion, the conveyor means second section being mounted at the rack second portion for moving the vehicles along the length of said rack second portion, and means operatively connected to said conveyor means first and second sections for selectively driving said second section alone and both said sections simultaneously; whereby the vehicles may be placed at one end of the rack and will be moved to the opposite end of the rack during which movement the various operations of oil changing and lubricating may be performed by operators positioned beneath the vehicles, and the movement of each vehicle may be stopped at the conveyor means first section for oil changing.

10. Lubricating rack construction including an oil changing and lubricating rack for supporting vehicles provided with space so that operators may be positioned beneath vehicles supported thereon, said rack having a length and ends and a first and second portion, the total length of the rack being equal to at least the combined lengths of a series of vehicles, conveyor means including a first and second section for engaging each of a series of vehicles supported on the rack simultaneously and thereby simultaneously moving the vehicles along the length of the rack, the rack first portion extending from one end of the rack to a point intermediate the ends of the rack and having a length equal to the length of at least one of said vehicles, the rack second portion extending from a point adjacent said intermediate point to the end of the rack opposite from said one end and having a length equal to at least the combined length of the remainder of said series of vehicles, the conveyor means first section being mounted at the rack first portion for moving the vehicles along the length of said rack first portion, the conveyor means second section being mounted at the rack second portion for moving the vehicles along the length of said rack second portion, means for selectively driving said conveyor means second section, and clutch means selectively engageable and operably connected to selectively transmit drive from said conveyor means second section to and driving said conveyor means first section; whereby the vehicles may be placed at one end of the rack and will be moved to the opposite end of the rack during which movement the various operations of oil changing and lubricating may be performed by operators positioned beneath the vehicles, and the movement of each vehicle may be stopped at the conveyor means first section for oil changing.

References Cited in the file of this patent

UNITED STATES PATENTS

| | | |
|---|---|---|
| 1,284,667 | Harris | Nov. 12, 1918 |
| 1,722,818 | Mugler | July 30, 1929 |
| 1,774,182 | McMillin | Aug. 26, 1930 |
| 1,969,002 | Gleichman | Aug. 7, 1934 |
| 2,126,796 | McMillin | Aug. 16, 1938 |
| 2,656,940 | Sumner et al. | Oct. 27, 1953 |

FOREIGN PATENTS

| | | |
|---|---|---|
| 707,789 | Great Britain | Apr. 21, 1954 |